Aug. 6, 1940.  H. CAMINEZ  2,210,061
INSERTING TOOL
Filed Jan. 24, 1939
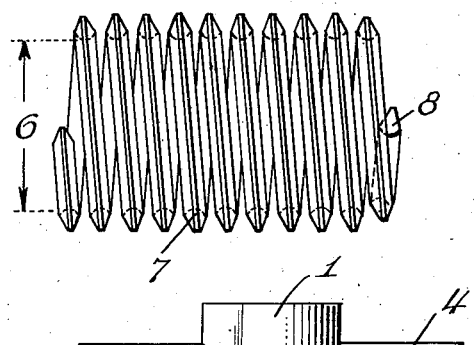
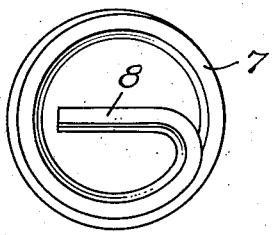
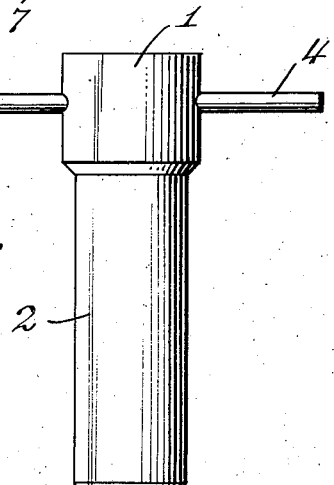
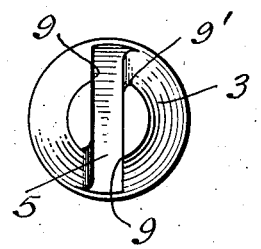
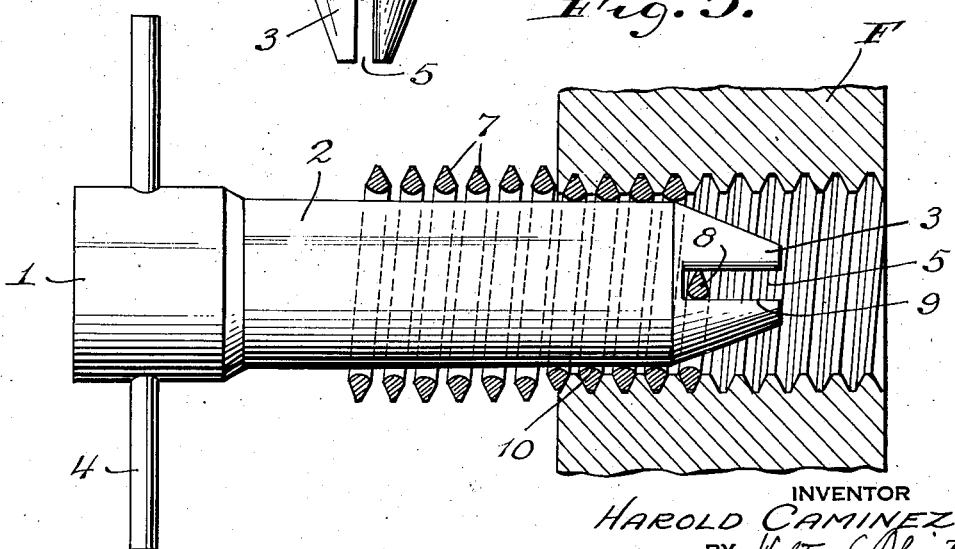
INVENTOR
HAROLD CAMINEZ
BY
ATTORNEY Patented Aug. 6, 1940

2,210,061

UNITED STATES PATENT OFFICE 2,210,061

INSERTING TOOL

Harold Caminez, Kew Gardens, N. Y., assignor to Aircraft Screw Products Company, Inc., Long Island City, N. Y., a corporation of New York Application January 24, 1939, Serial No. 252,556

4 Claims. (Cl. 7—14.1)

The present invention relates to a tool for inserting, into the thread groove of a female screw member, a wire coil insert which is intended to be engaged by the threads of a male screw member, for instance in a screw connection of the types described in my copending applications Ser. No. 91,263, filed July 18, 1936, Patent No. 2,150,875, Ser. No. 190,168, filed Feb. 12, 1938, and Ser. No. 246,814, filed Dec. 29, 1938, Patent No. 2,152,681. Coil inserts of the type under consideration are usually wound with an external diameter larger than the corresponding diameter of the thread groove of the female member. For this reason difficulties are encountered when one tries to force the coil into position in the female member.

The present invention aims to overcome said difficulties and consists in a tool of particular form which is adapted to engage a tang of the first convolution of the wire coil so as to contract the coil when a frictional resistance is exercised by the female member on the entering coil. The invention further consists in the provision of cutting edges in order to remove the tang after the insertion of the coil. The invention also consists in the shape of the tool formed to serve as a gauge of the inner diameter of the wire coil during and after its insertion.

Further details and objects of the invention will be apparent from the description hereinafter and the accompanying drawing illustrating an embodiment thereof by the way of example. In the drawing—

Fig. 1 is a side elevation and

Fig. 2 a front view of a wire coil to which my new tool may be applied.

Fig. 3 is a side elevation of the tool according to the invention.

Fig. 4 is an end view thereof, and

Fig. 5 is a section of a female threaded member with a wire coil and the new tool during the inserting operation.

Referring now to the drawing, the tool illustrated in Figs. 3 and 4 comprises a head portion 1, a shank 2 and an end portion 3. The head portion is provided with an arrangement by which it may be gripped and turned for instance with a handle 4. The end portion 3 is longitudinally slotted at 5 and preferably slightly tapered as shown. The diameter of the shank 2 is smaller than the inner diameter 6 of coil 7 for which the tool is destined. Now it is clear that the tool may be inserted into the coil from its trailing end until tang 8 at the forward end of coil 7 engages in slot 5 and bears against the slot bottom. In this relative position of the tool and the coil the latter may be inserted into a suitable female screw member F by turning the tool at its handle 4 in the same manner as for instance a conventional screw driver is turned. Thereby the torque for inserting the coil into the female screw member is applied through the walls of slot 5 to the tang 8 and hence to the entering convolution of the coil which, thus, is contracted owing to the frictional resistance exerted by the female screw member. Being, however, contracted the coil can easily be screwed in. After the coil is inserted, the tool may be retracted in axial direction.

In many instances it is desirable to remove the tang 8 of the coil after its insertion. This may be accomplished by turning the tool in the opposite direction. This tends to expand the coil which thus will be pressed into the thread of the female member so much so that the coil is prevented from following the torque exerted by the tool. In consequence thereof the tang 8 will be sheared off. In order to facilitate this shearing action, that edge 9 of the slot-forming walls of the tool which bears against the tang during the shearing operation may be sharp while the other edge 9' at the same end of the slot is preferably rounded off so as to clear the radius at the bent portion of the tang 8. The diametrically opposite edges of the other end of the slot may be shaped correspondingly as clearly shown in Fig. 4, thus permitting the tool to be used with either end of the slot in engagement with the bent portion of the tang. It is obvious that the provision of cutting edges at both ends of the same wall of the slot and of rounded edges at both ends of the other wall of the slot would make the tool applicable to a coil wound in a clock-wise direction as well as to a coil wound in the opposite direction.

It has been stated that the shank 2 of the tool is to be made smaller in diameter than the innermost diameter with which the coil 7 is wound. This is necessary because, as hereinbefore mentioned, the coil will be contracted during the inserting operation. Now it is advisable to make the shank diameter so as to fit accurately the size of the innermost diameter the coil is supposed to have after it is inserted as at 10. This being done, the shank of the tool serves as a gauge because any deviation from the desired size of the diameter of the inserted coil will be noticeable during the insertion of the coil as well as when the tool is retracted.

If both operations can be performed without or with only very little resistance, the inner diameter of the inserted coil is too large. On the other hand, too small a diameter of the coil will be apparent by too much resistance encountered in the manipulation of the tool.

If the inserting tool is so dimensioned as to serve as a gauge, that means, if the shank 2 is of a diameter, exactly fitting the desired inner diameter of the inserted coil 7 the aforementioned taper or reduced size of the end portion 3 is of particular advantage for the following reasons. On the one hand, the taper facilitates the introduction of the tool into the coil prior to the insertion of the latter into a female screw member; on the other hand, if, as shown in the drawing, the taper reaches at least slightly farther up the shank than the bottom of the slot 5, the first or entering convolution of the coil may be more contracted than the other convolutions which will contact the gauging cylindrical surface of the shank 2. This feature facilitates the insertion of the coil into the said screw member.

What I claim is:

1. A tool for inserting a wire coil into the thread groove of a female screw member, which comprises a shank, a head portion, an end portion, and means on said head portion to apply a torque about the longitudinal axis of said shank, said shank being adapted to be introduced into said coil, and said end portion being provided with a longitudinal slot to engage therein a tang of said coil, one edge of the slot-forming walls of said end portion being sharp and the other edge at the same end of the slot being rounded.

2. A tool as claimed in claim 1 in which one pair of diagonally opposite edges of the slot-forming walls of said end portion are sharp and the other pair of edges are rounded.

3. A tool as claimed in claim 1 in which said shank is shaped and dimensioned as a gauge for the inner diameter of the inserted coil.

4. A tool as claimed in claim 1 in which said shank is shaped and dimensioned as a gauge for the inner diameter of the inserted coil, said end portion being of a thickness smaller than said shank over a length at least slightly longer than said slot therein.

HAROLD CAMINEZ.